(12) United States Patent
Fishman et al.

(10) Patent No.: US 7,519,720 B2
(45) Date of Patent: Apr. 14, 2009

(54) PUSHING RICH CONTENT INFORMATION TO MOBILE DEVICES

(75) Inventors: Neil Fishman, Bothell, WA (US); Don Kadyk, Bothell, WA (US); Brent Curtis, Seattle, WA (US); Marc Seinfeld, Kenmore, WA (US); Mark Ledsome, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 11/532,768

(22) Filed: Sep. 18, 2006

(65) Prior Publication Data
US 2007/0016690 A1  Jan. 18, 2007

Related U.S. Application Data

(63) Continuation of application No. 09/771,338, filed on Jan. 26, 2001, now abandoned.

(51) Int. Cl.
*G06F 15/16* (2006.01)
(52) U.S. Cl. .................. 709/230; 709/231; 709/238; 709/246
(58) Field of Classification Search .................. 709/231, 709/238, 230, 246
See application file for complete search history.

(56) References Cited

U.S. PATENT DOCUMENTS

| | | | |
|---|---|---|---|
| 5,742,905 A * | 4/1998 | Pepe et al. ................. | 455/461 |
| 5,845,079 A | 12/1998 | Wada | |
| 5,850,517 A * | 12/1998 | Verkler et al. ............... | 709/202 |
| 5,953,507 A | 9/1999 | Cheung | |
| 6,021,433 A | 2/2000 | Payne | |
| 6,125,388 A | 9/2000 | Reisman | |
| 6,167,441 A | 12/2000 | Himmel | |
| 6,421,717 B1 | 7/2002 | Kloba | |
| 6,499,021 B1 * | 12/2002 | Abu-Hakima ................. | 706/10 |
| 6,553,410 B2 * | 4/2003 | Kikinis ....................... | 709/218 |
| 6,553,412 B1 | 4/2003 | Kloba | |
| 6,567,828 B2 * | 5/2003 | Inohara et al. .............. | 707/204 |
| 6,701,378 B1 | 3/2004 | Gilhuly | |
| 6,704,024 B2 * | 3/2004 | Robotham et al. .......... | 345/581 |
| 6,750,830 B1 * | 6/2004 | Teshima et al. .............. | 345/1.2 |
| 6,779,019 B1 | 8/2004 | Mousseau | |
| 6,785,680 B1 | 8/2004 | Cragun | |

(Continued)

OTHER PUBLICATIONS

Office Action dated Jun. 10, 2004 cited in U.S. Appl. No. 09/771,338 (Copy Attached).

(Continued)

*Primary Examiner*—William C Vaughn, Jr.
*Assistant Examiner*—Kristie D Shingles
(74) *Attorney, Agent, or Firm*—Workman Nydegger

(57) ABSTRACT

Methods, systems, and computer program products for customizing content based on at least one operating characteristic of a mobile client. A mobile gateway receives content from a content source, such as an email server, a Web server, or some other content server. For example, content may include email, calendar, contact, task, Web, notification, financial, sports data, configuration information, etc. The mobile gateway customizes the content based on transforms assigned to each mobile client. Transforms account for differences in the software, display, processor, memory, communication channel, and the like, of each mobile client, without imposing additional processing burdens on the content server. Processing that is common among several transforms may be shared. Mobile clients may be any type of computer, including telephones, pagers, PDAs, laptops, and other mobile gateways.

35 Claims, 6 Drawing Sheets

U.S. PATENT DOCUMENTS

| | | |
|---|---|---|
| 6,839,744 B1 * | 1/2005 | Kloba et al. ............... 709/219 |
| 6,947,995 B2 * | 9/2005 | Chang et al. ............... 709/231 |
| 7,089,295 B2 | 8/2006 | Christfort |
| 7,127,705 B2 | 10/2006 | Christfort |
| 7,210,100 B2 * | 4/2007 | Berger et al. ............... 715/229 |
| 2001/0047426 A1 | 11/2001 | Hunter |
| 2002/0052925 A1 | 5/2002 | Kim |
| 2002/0087630 A1 | 7/2002 | Wu |
| 2002/0087704 A1 * | 7/2002 | Chesnais et al. ........... 709/228 |
| 2002/0103908 A1 | 8/2002 | Rouse |
| 2002/0107985 A1 | 8/2002 | Hwang |

OTHER PUBLICATIONS

Office Action dated Dec. 3, 2004 cited in U.S. Appl. No. 09/771,338 (Copy Attached).
Office Action dated Jun. 1, 2005 cited in U.S. Appl. No. 09/771,338 (Copy Attached).
Office Action dated Sep. 22, 2005 cited in U.S. Appl. No. 09/771,338 (Copy Attached).
Office Action dated Mar. 20, 2006 cited in U.S. Appl. No. 09/771,338 (Copy Attached).

* cited by examiner

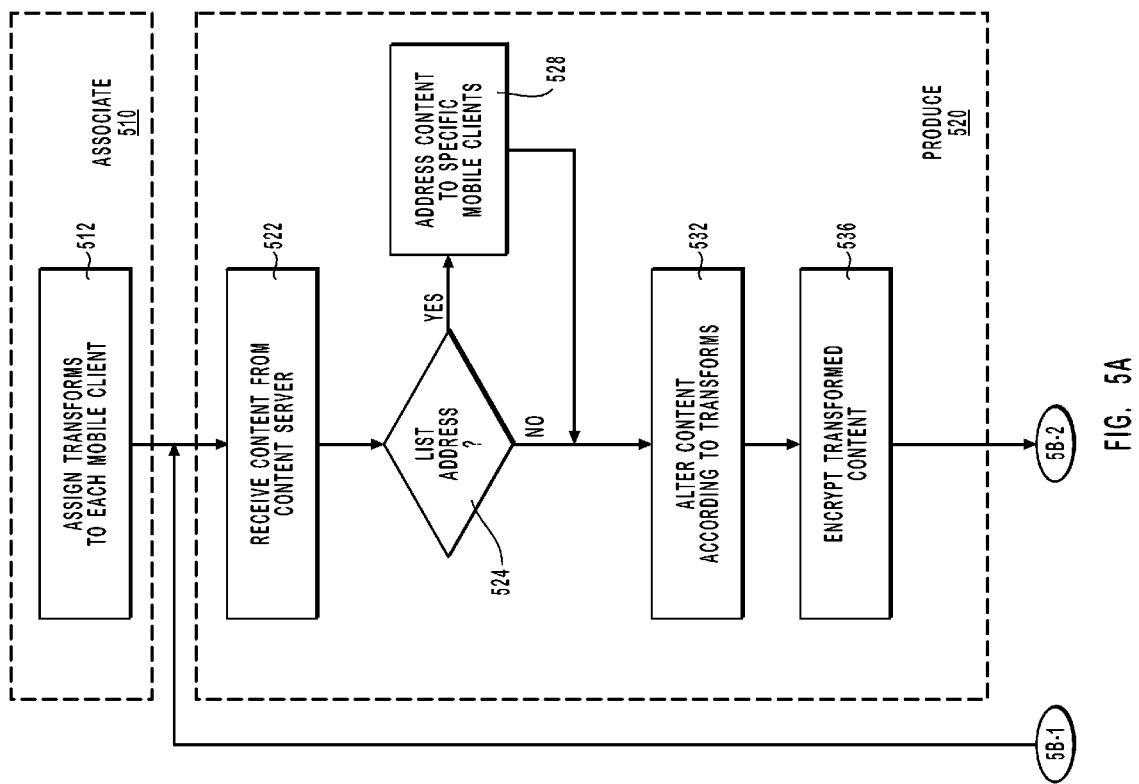

PUSHING RICH CONTENT INFORMATION TO MOBILE DEVICES

CROSS-REFERENCE TO RELATED APPLICATIONS

The present application is a Continuation of U.S. patent application Ser. No. 09/771,338, filed on Jan. 26, 2001, entitled "Pushing Rich Content Information to Mobile Devices," the entire contents of which are incorporated herein by reference.

BACKGROUND OF THE INVENTION

1. The Field of the Invention

The present invention relates to providing content to mobile clients. More specifically, the present invention relates to methods, systems, and computer program products for customizing content based on one or more operating characteristics of a mobile client.

2. Background and Related Art

In past years, access to electronic content, such as email, Web pages, financial data, sports information, etc., typically has occurred from either a home or office computer. These home and office computers may be classified in two broad categories, laptop computers and desktop computers. The selection between laptop and desktop generally depends on the needs of a particular user. Where some level of portability is desirable, laptop computers are the obvious choice. Otherwise, desktops are the usual selection because laptops ordinarily command a price premium based on their relatively small size when compared to desktops having comparable processing capabilities.

More recently, society in general has been placing an ever-increasing value on mobile access to information. Heightened demand for content, both in business and personal settings, has generated a need for content to be available immediately, from almost anywhere at almost any hour. Therefore, access limited to laptop or desktop computing systems presents a substantial detriment. One of the most significant drawbacks with desktop computers is readily apparent: it is impractical if not impossible to carry a desktop computer around as a user moves from one place to another. Thus, access to content via desktop computer is limited to the location of the desktop computer.

While laptops ease the burden imposed by transporting a computer from one physical location to another, they are only a relatively minor improvement in terms of providing constant access to information. Among other things, (i) the size and bulk of laptop computers preclude a user from carrying a laptop on his or her person; (ii) limited battery life prohibits constant operation; (iii) boot time makes quick content access impractical; and (iv) laptops usually are connected to a specific network, covering a relatively small geographic area. In short, laptops provide a sensible solution for intermittent access to content, but are ill suited for constant mobile access.

In contrast, truly mobile devices, such as telephones, pagers, personal digital assistants ("PDAs"), and the like, are easily placed in a purse or pocket, operate for many hours by switching to a standby mode when not in use, require no boot time, and use wireless protocols, covering large geographic areas, for communication. Initially, limited processing and display capabilities constrained telephones and pagers to voice or small amounts of text. While PDAs provided more processing and display characteristics, only short range, infrared, wireless connections were available. However, as the demand for constant mobile access to information has become more pronounced, the once separate technologies of computers, telephones, pagers, PDAs, etc., are converging. For example, the displays, processing, and memory of telephones and pagers are increasing, and PDAs are supporting telephone and pager like communication links.

Nevertheless, the rapidly changing technology of mobile devices presents a number of significant obstacles to providing constant mobile access to information. In particular, the operating characteristics of mobile devices vary greatly. For example, various operating systems, application software, and the like, may represent data differently, support different data fields, and/or support different file types. Differences in hardware impose further barriers in furnishing constant mobile access to information. In spite of the technology convergence mentioned above, telephones typically have the least amount of display area, followed by pagers. PDAs generally have more display, memory, and processor power than either telephones or pagers, but these characteristics vary substantially from one PDA to another.

Even for mobile devices having similar display, memory, and processor capabilities, the assortment of communication links and software that are supported by mobile devices often requires one device to be treated differently from another. As a result, content may need to be tailored or customized for each specific device receiving or requesting content. For example, an email delivered to a telephone may only include textual content based on the display capabilities of the telephone, whereas the same message delivered to a laptop computer may include the textual content and some attached multimedia content. Email software on one telephone may support only certain data fields or file formats for attachments, and may require an underlying data format that is different as compared to other telephones. Similar issues exist for other types of content, such as Web pages, financial data, sports information, meeting reminders, calendars, contacts, mailbox summaries, configuration data, etc., due to the wide variety of operating characteristics found in mobile devices.

While customizing content based on the device that will receive the content is desirable, customization leads to problems of its own. For example, email servers often operate at near capacity. Introducing the additional processing necessary to customize content by device operating characteristics may degrade server performance beyond tolerable limits. Furthermore, implementing the customization at an email server requires changes to the email server for each new type of mobile device that becomes available. Frequent changes to email server code imposes substantial coding and testing responsibilities on developers, due to the already complex nature of email servers. Moreover, already overburdened information systems staff are forced into essentially constant upgrade cycles as developers release new software, especially for rapidly advancing technologies like mobile devices. Other types of content servers suffer from similar considerations.

SUMMARY OF THE INVENTION

These and other problems with the prior art are overcome by the present invention, which is directed toward using a mobile gateway to customize content based on one or more operating characteristics of a mobile client. The mobile gateway includes content transforms based on the individual operating characteristics of the various mobile clients that are supported. Upon receiving content for a mobile client, the mobile gateway identifies the appropriate transform, transforms the content, and sends the transformed content to the mobile client.

The mobile gateway is not limited to processing any particular type of content and is not limited to any particular mobile clients or corresponding transforms. For example, the mobile gateway may transform email content, Web content, financial data, sports information, notifications, schedules, contacts, configuration data, etc. Transforms may be based on any relevant operating characteristic of a mobile client, such as processor, memory, display, communication link, application or operating software, etc.

As used in this application, "mobile client" should be interpreted broadly to include virtually any type of computing device, and is not necessarily limited to devices that are easily or conveniently moved. For example, mobile gateways may be cascaded, meaning that one mobile gateway may be a mobile client of another mobile gateway. Telephones, pagers, PDAs, and the like, are merely examples of mobile computing devices and should not be viewed as necessarily limiting the scope of the present invention. One aspect of the invention is the mobile gateway's ability to support new mobile devices as they become available without requiring changes to be made at the content server. As such, it is fully expected that a wide range of mobile devices will become available in the future and should be considered to fall within the meaning of mobile client. Furthermore, specific reference to telephones, pagers, PDAs, and the like, should not be interpreted as excluding support for other types of devices, such as laptops, desktops, etc. The mobile gateway is capable of supporting a wide range of computing devices. Some mobile devices, however, may require more substantial transforms than others.

The mobile gateway does not limit how content is requested and/or received. In some circumstances, a client will request data through the mobile gateway and the transformed content will be delivered to the mobile client as a result of the request. For example, the mobile client may request Web content from the content source. Alternatively, the mobile gateway may transform and deliver content that the mobile client has not explicitly requested. For example, an email notification, change in stock price, or some other event (likely based on criteria set by a user of a mobile client), may trigger the sending of content to the mobile gateway.

The same content may be transformed for more than one mobile client. When content is addressed to multiple mobile clients, the mobile gateway will identifying the appropriate transform for each mobile client, transform the content for each addressed mobile client based on the identified transform, and deliver transformed content to each mobile client. If two different mobile clients share similar operating characteristics, a single transform may be used for both mobile clients.

Using the mobile gateway provides constant mobile access to content for a wide variety of mobile clients. Whether the content is for a business traveler checking for messages, family and friends exchanging personal information, the results or score of a sporting event, changes in financial markets or investments, or some other purpose, the mobile gateway provides mobile clients with continuous access to the content that is of interest to them. In providing this access, no additional processing burdens are placed on the content source. Furthermore, mobile clients are not dependent on the content source to provide customized access based on the particular operating characteristics of each mobile client. Customization need only be implemented at the mobile gateway.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIGS. 5A and 5B depict an exemplary method for customizing content based on one or more operating characteristics of a mobile client.

DETAILED DESCRIPTION OF THE INVENTION

The present invention extends to methods, systems, and computer program products for customizing content based on the operating characteristics of mobile clients. As noted earlier, a mobile client's operating characteristics encompasses any consideration that is relevant to a content source in providing the mobile client with content, including communication link, differences in hardware or software, and the subjective interests of a mobile client user. In other words, anything and everything between a content source and a mobile client, including the source and client themselves, is within the meaning of an operating characteristic. A mobile gateway receives the content and applies an appropriate transform based on one or more operating characteristics of the mobile clients that will receive the content. Using a mobile gateway allows for support of new mobile clients without requiring modifications to the content server. Furthermore, the additional burdens of customizing content for mobile clients are met by the mobile gateway, without imposing additional processing overhead on the content server. Embodiments of the present invention may comprise a special purpose or general purpose computer including various computer hardware, as discussed in greater detail below.

Embodiments within the scope of the present invention also include computer readable media for carrying or having computer-executable instructions or data structures stored thereon. Such computer-readable media can be any available media that may be accessed by a general purpose or special purpose computer. By way of example, and not limitation, such computer-readable media can comprise RAM, ROM, EEPROM, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
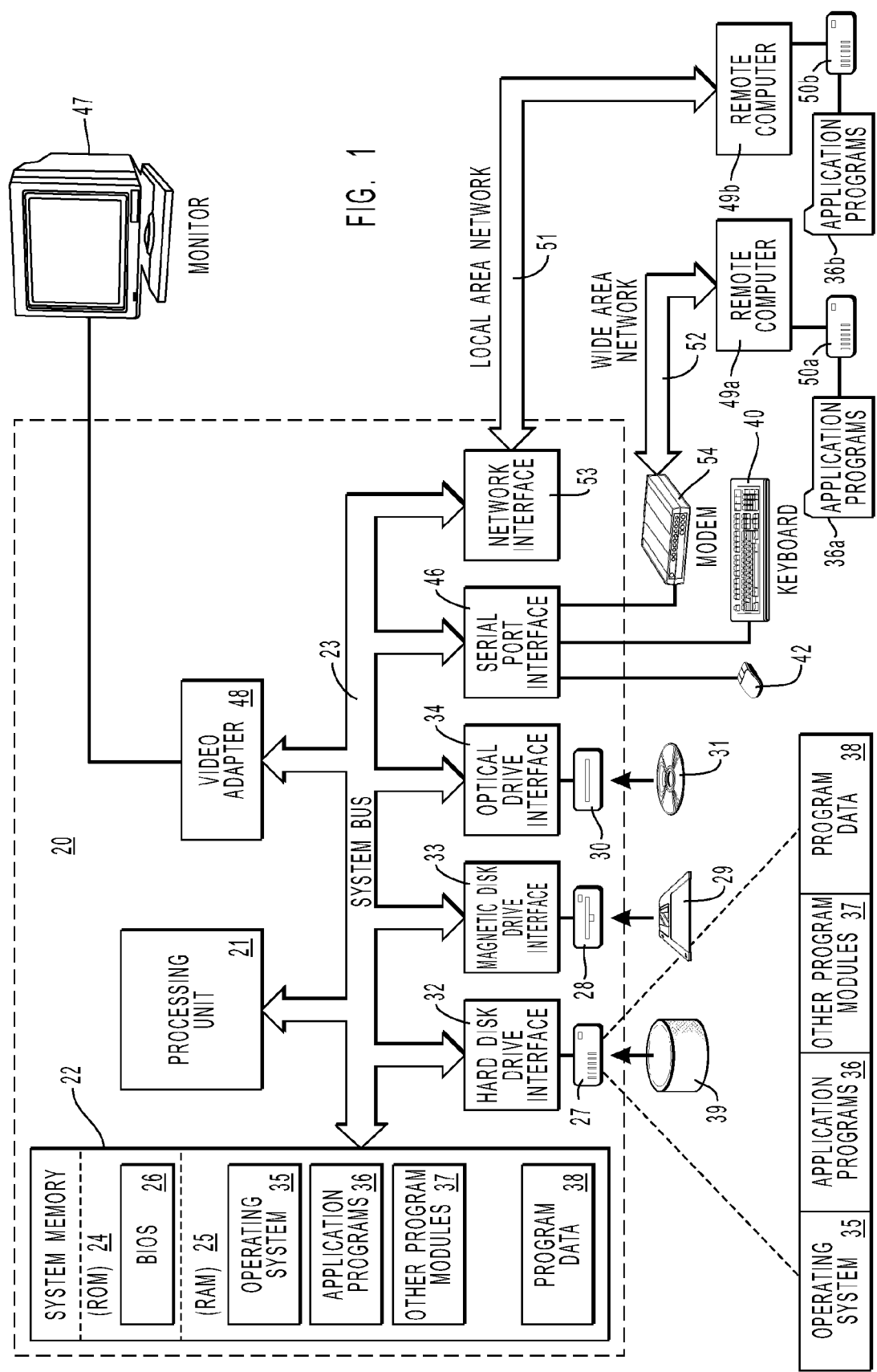
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
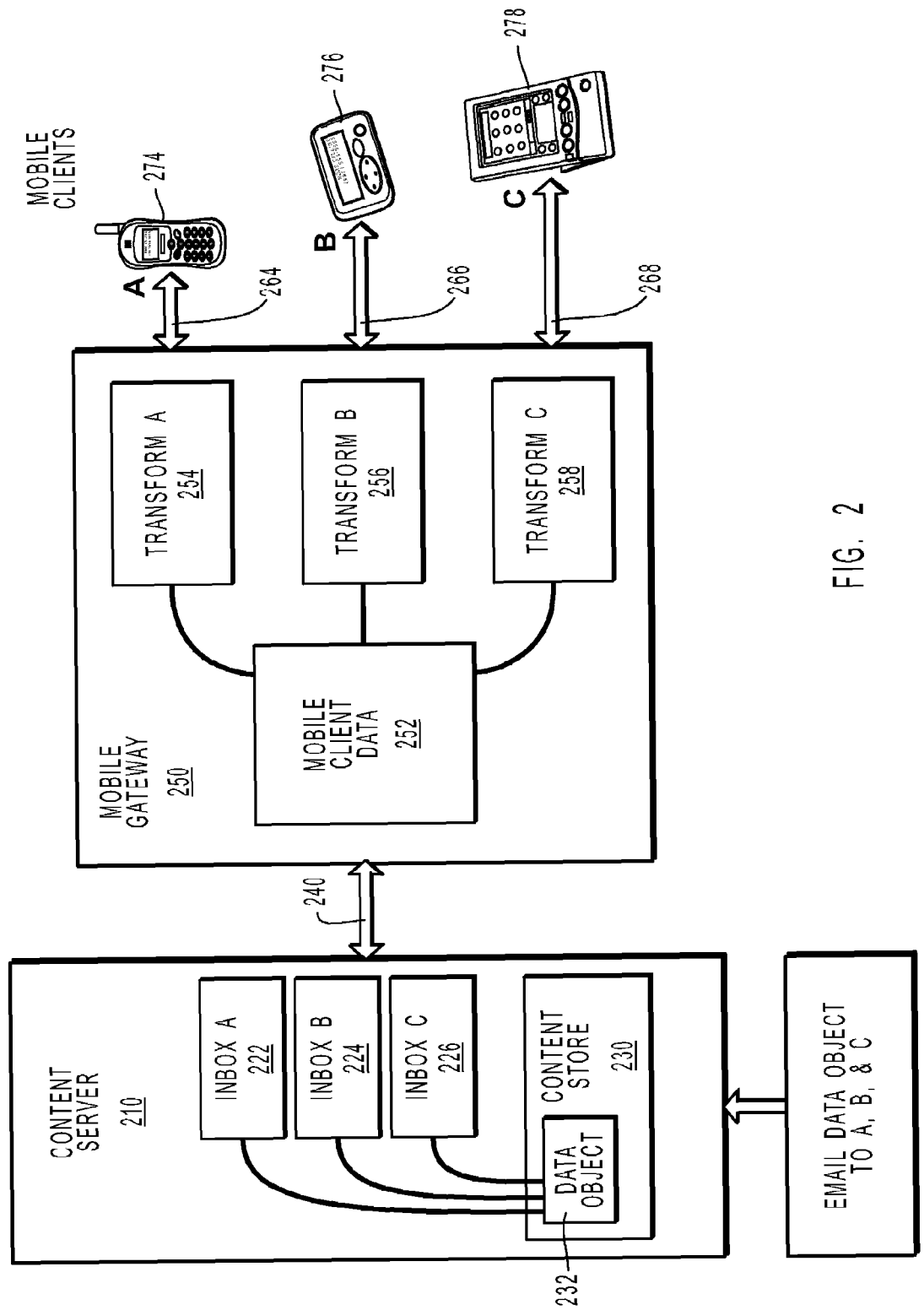
FIG. 2 is a block diagram showing an exemplary mobile gateway that transforms email content for mobile clients.

FIG. 2 shows mobile gateway 250 customizing email content for various mobile clients, such as phone 274, pager 276, and PDA 278. Email content may include various mailbox summaries (e.g., inbox, sent, saved, etc.) and is but one example of the content that may be customized by mobile gateway 250. Other examples include calendar data, including daily schedules, contact data, task data, Web content, financial data, sports information, notifications, etc. Similarly, notifications may represent a wide range of content, including newly available email content, calendar or task reminders, changes in financial data, such as a change in the value of a particular investment, current financial data, such as current market conditions, and current or recent sports information, such as the score or results of a sporting event. Those of skill in the art will further recognize that the specifically enumerated types of content are not mutually exclusive. For example, sports information may be delivered in the form of Web content. As used in this application, therefore, the term "content" should be interpreted broadly to encompass all of the foregoing examples as well as other content. No specific references to particular types of content should be interpreted as necessarily limiting the present invention in any way, absent explicit language to the contrary.

Content server 210 includes content store 230, storing data object 232. Inbox A 222, inbox B 224, and inbox C 226 all refer to data object 232. As shown, only a single copy of data object 232 exists at content server 210. This may occur when a single data object is emailed to multiple recipients. Rather than storing the data object separately for each recipient, content server 210 may store a single copy of the data object, and allow each recipient's inbox to reference the single copy. Alternatively, content server 210 may store a separate copy of the data object for each recipient. The present invention is not limited by how content server 210 chooses to store a particular data object. Each of inbox A 222, inbox B 224, and inbox C 226 is configured to notify recipients when a new email is received, such as the one identified as data object 232. As a result, content server 210 uses communication link 240 to send notifications of the newly received data object 232 to all recipients through mobile gateway 250.

Mobile gateway 250 includes mobile client data 252 for associating the appropriate transforms with each mobile client. Phone 274 is labeled with an "A" to indicate that it corresponds to inbox A 222. Similarly, the label "B" next to pager 276 and the label "C" next to PDA 278 indicate correspondence with inbox B 224 and inbox C 226, respectively. Phone 274, pager 276, and PDA 278 communicate with mobile gateway 250 over communication links 264, 266, and 268, respectively. When mobile gateway 250 receives content for a mobile client, mobile client data 252 identifies the type of mobile client that will receive the content and the transform associated with that mobile client. Mobile client data 252 may be based on data received from mobile clients (such as may be present in the headers of a hypertext transfer protocol or other type of request) or may be based on one or more known operating characteristics of a particular mobile client. For example, transform A 254 is associated with phone 274, transform B 256 is associated with pager 276, and transform C 258 is associated with PDA 278.

The nature of transforms A 254, B 256, and C 258 depend on the operating characteristics of the corresponding mobile clients. For example, resources such as software, hardware, etc., are likely to vary between phone 274, pager 276, and PDA 278. Software operating characteristics encompass a wide range of differences between the operating systems and applications available at various mobile clients, including differences in character sets, browser versions and extensions, evolving communication protocols, data representations for strings or numbers, supported data fields or file types, mobile client location, and the like. Furthermore, mobile gateways may offer a variety of services to mobile clients. Over time, the services available to any particular mobile client are subject to change. For example, a mobile client may drop an existing service or add a new service. As part of changing some services, mobile clients may need to receive certain control or configuration information. Transforms A 254, B 256, and C 258 may be used to customize the control or configuration information for individual mobile clients. Likewise, hardware operating characteristics, such as display area, processor speed, available memory, and communication link also are likely to vary from one mobile client to another. For example, phones often have the smallest display area, PDAs the largest, and pagers are somewhere in between. To compensate, transform A 254 of mobile gateway 250 may reduce a received data object to the minimal amount of display area possible. In an email notification context, perhaps transform A 254 limits the subject line to 25 characters or less.

However, the present invention is not limited by the actual or relative operating characteristics of any particular mobile client. Those of skill in the art will recognize that a wide variety of mobile devices are available and that many new varieties will become available in the future. Furthermore, the actual format of content received by a mobile client is not limited in the present invention. Rather, mobile gateway 250, along with transform A 254, transform B 256, and transform C 258 ensure that the content received by mobile clients 274, 276, and 278 is appropriate for one or more operating characteristics of each respective mobile client. As such, the term "operating characteristics" should be interpreted broadly to account for any difference in the operation of one mobile client as compared to another, including each of the foregoing examples.

Mobile gateway 250 also may request content from content server 210 on the behalf of mobile clients. In the email context currently being described, after mobile client 274 receives a customized notification that data object 232 is available, mobile client 274 may request retrieval of data object 232 through mobile gateway 250. After retrieving data object 232 from content server 210, mobile gateway 250 will customize data object 232 for one or more operating characteristics of mobile client 274 using transform A 254.

Note that content server 210 simply provides content in the usual manner, without any regard for the operating characteristics of any mobile clients. Mobile gateway 250 shields content server 210 from having to know the operating characteristics of the mobile clients. However, this does not mean that content server 210 is completely ignorant regarding mobile clients 274, 276, and 278. For example, content server 210 may include rules for determining the type of content that should be sent to mobile gateway 250. Based on these rules, perhaps on a client by client basis, content server 210 may determine not to send a large multimedia file to mobile client 274. Nevertheless, any processing performed by content server 210 that may be specific to mobile clients, usually is minor in comparison to the processing performed in customizing content based on the operating characteristics of mobile clients, as exemplified by transform A 254, transform B 256, and transform C 258.

Figure 3:
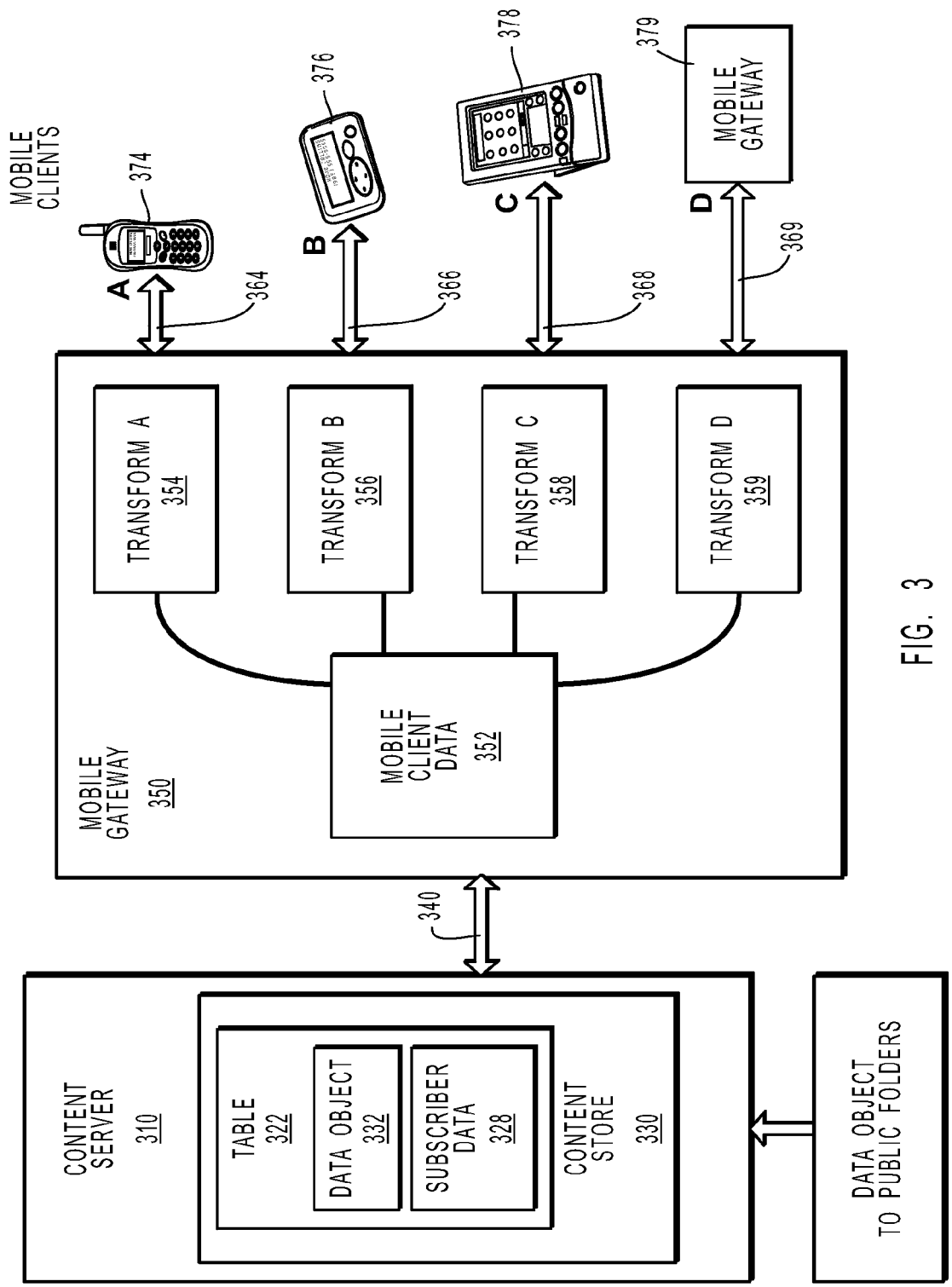
FIG. 3 is a block diagram showing an exemplary mobile gateway that transforms table content for mobile clients.

FIG. 3 shows mobile gateway 350 customizing the contents of table 322 for mobile clients, including phone 374, pager 376, PDA 378, and mobile gateway 379. Content server 310 includes content store 330 containing the table 322, which stores data object 332 and subscriber data 328. Generally, table 322 stores information that is shared among several users, such as calendar data, contact data, collaborative documents, policies and procedures, discussion groups, etc. Subscriber data 328 may be used to identify the users who have permission to access table 322, identify users who have expressed an interest in the contents of table 322, or identify users who should receive a copy of data object 332.

Using communication link 340, mobile gateway 350 may be configured to receive data object 332 along with a list of one or more intended recipients. Mobile gateway 350 examines mobile client data 352 to identify the mobile clients contained in the list, such as phone 374, pager 376, PDA 378, and mobile gateway 379. In identifying the mobile clients contained in the list, mobile gateway 350 also identifies the corresponding transform to be used in customizing data object 332 based on one or more operating characteristics of the mobile clients that will be sent data object 332. Transform A 354 corresponds to phone 374, transform B 356 corresponds to pager 376, transform C 358 corresponds to PDA 378, and transform D 359 corresponds to mobile gateway 379.

Those of skill in the art will recognize that one aspect of transform A 354, transform B 356, transform C 358, and transform D 359, is to consider the communication links, 364, 366, 368, and 369, between mobile gateway 350 and mobile clients 374, 376, 378, and 379. As used in this application, communication link should be interpreted broadly to include any form or type of communication between a mobile client and a mobile gateway. For example, communication links 364, 366, 368, and 369 may be implemented as unidirectional communication links, pushing content to mobile clients through notifications, or as bi directional communication links. As such, mobile gateway 350 may implement a wide variety of communication protocols, including wireless protocols to facilitate the mobility of the mobile clients and wireline connection protocols. The wireless transport protocol ("WTP") is an example of a protocol commonly used in wireless communication and HTTP is an example of a protocol commonly used in wireline connections. Furthermore, communication links 364, 366, 368, 369, and 340 may comprise one or more communication protocols in combination with one another.

Although not shown, each transform may include a number of sub transforms. For example, the implementation of a particular communication protocol or encryption technology may occur in a sub transform. Where two or more mobile clients share the same communication protocol, type of communication link, or encryption technology, the corresponding transforms for those mobile clients may share the sub transform that implements the communication protocol, type of communication link, encryption technology, etc.

Likewise, those of skill in the art will recognize that similar mobile clients may be connected to mobile gateway 350 over distinct communication links. As described above, the transforms for these similar mobile clients may be identical except for separate sub transforms implementing the communication link. The distinction between sub transform and transform is semantic only and described in this fashion only to indicate that transforms may share processing where appropriate. Thus, any differentiation between sub transform and transform is completely arbitrary. A transform may comprise one or more sub transforms. Alternatively, a transform may be a combination of several transforms and/or sub transforms. As such, the term "transform" should be interpreted broadly to include any number of transforms and/or sub transforms, singly or in combination, that may or may not be included within other transforms, either in whole or in part.

By placing transforms A 354, B 356, C 358, and D 359, in mobile gateway 350, content server 310 is not required to implement any of the communication protocols used in communication links 364, 366, 368, and 369. Content server 310 need only support a single communication protocol for exchanging content with mobile gateway 350 over communication link 340. As a result, content server 310 is not burdened with supporting the large number of communication protocols that may be needed for communicating with mobile clients. Furthermore, new communication links may be implemented and old communication links may be upgraded at mobile gateway 350 without significantly impacting the operation of content server 310.

Mobile gateway 379 shows that a mobile gateway is another type of mobile client. Cascading mobile gateways in this manner provides additional flexibility in a given implementation for providing customized content to mobile clients. Like transforms A 354, B 356, and C 358, transform D 359 customizes content for mobile gateway 379. For example, transform D 359 may provide the data fields and representations that are supported by mobile gateway 379, compress the content, and implement the protocol used over communication link 369. Mobile gateway 379 operates like mobile gateway 350, and includes transforms for the mobile clients it serves. For example, the transforms of mobile gateway 379 may implement the protocols for communicating with the mobile clients of mobile gateway 379, and may implement encryption to ensure secure communication.

Figure 4:
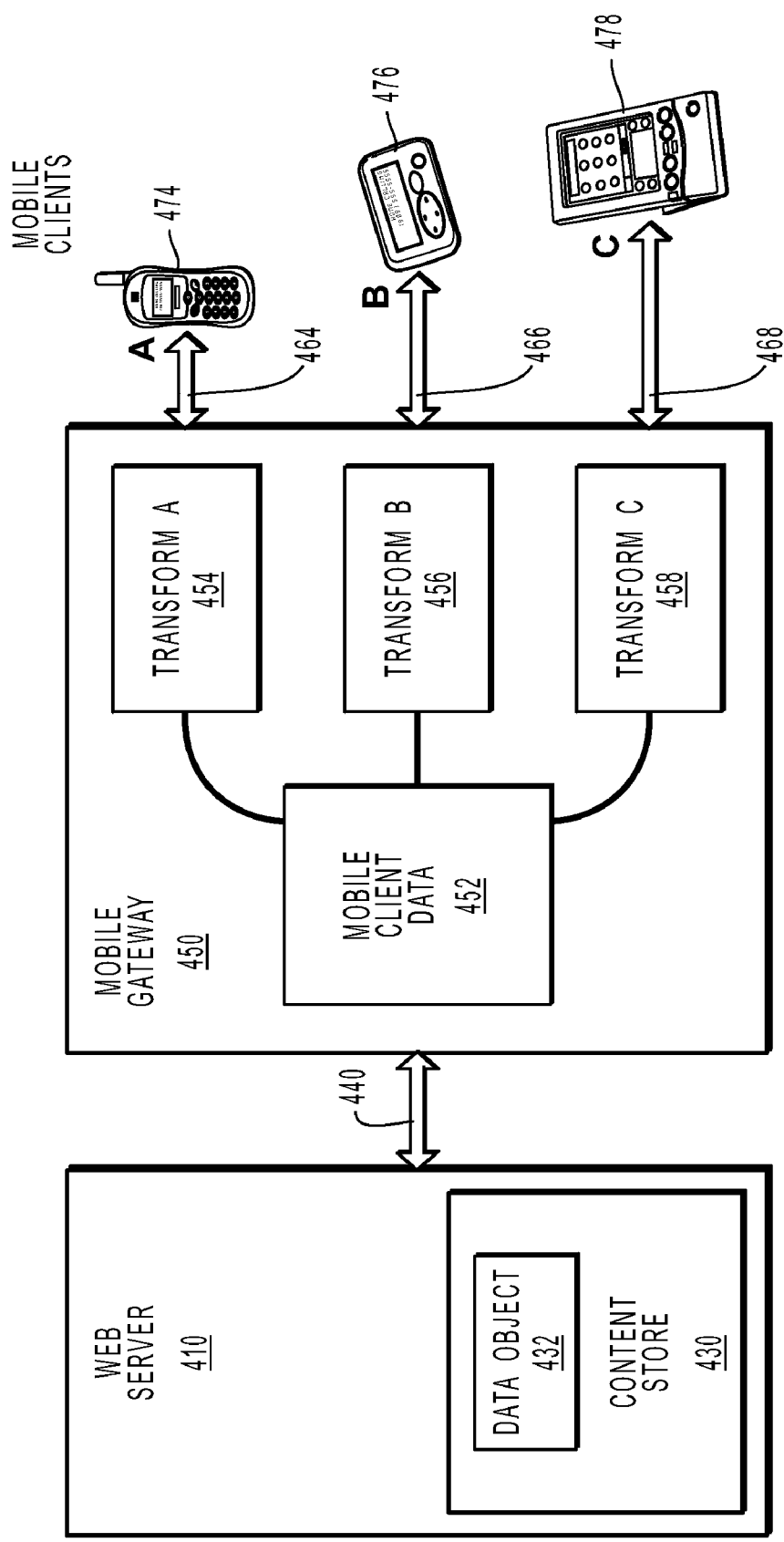
FIG. 4 is a block diagram showing an exemplary mobile gateway that transforms Web content for mobile clients.

FIG. 4 shows mobile gateway 450 customizing Web content from Web server 410 for phone 474, pager 476, PDA 478, and other mobile clients. Web server 410 includes content store 430 storing data object 432. Mobile gateway 450 and Web server 410 exchange content over communication link 440. When mobile gateway 450 receives data object 432 in response to a request originating from one of phone 474, pager 476, or PDA 478, mobile client data 452 identifies the appropriate transform that must be performed to customize data object 432 for the requesting mobile client. As noted previously, similar mobile clients may share a single transform.

Upon receiving an appropriate request from PDA 478, mobile gateway 450 retrieves data object 432 from content store 430 of Web server 410. Mobile client data 452 identifies transform C 458 as the transform to be used in customizing data object 432 based on one or more operating characteristics of PDA 478. All processing performed by transform C 458 need not be unique to PDA 478. For example, PDA 478 may communicate with mobile gateway 450 over an encrypted communication link that also uses some form of data compression. Pager 476 and phone 474 may use similar encryption and/or compression technology. In this case, transform A 454, transform B 456, and transform C 458, may all share a common implementation for encryption and data compression. Alternatively, a different encryption and data compression implementation may be present for each mobile client.

As indicated above, customizing data object 432 for phone 474, pager 476, and PDA 478, may include a variety of transforms, based on the operating characteristics of each mobile client. For example, phone 474, pager 476, and PDA 478 may have different operating systems and/or application software. Data object 432 may include text, graphics, markup, and multimedia content. Pager 476 and phone 474 may not include an MPEG decoder for viewing the multimedia content or may not include sufficient memory, processor capability, and display area for showing graphics. Pager 476 may support only plain text. Communication link 464 for phone 474 may be ill suited for transferring large files, whereas communication link 466 for pager 476 and communication link 468 for PDA 478 may provide a greater bandwidth and packet size, allowing large files to be transferred without significant concern. The display area for phone 474 may provide for a relatively small number of characters when compared to the display area of PDA 478. Transforms A 454, B 456, and C 458 consider one or more of these operating characteristics and customize data object 432 accordingly. Although phone 474, pager 476, and PDA 478, all request the same data object 432, each may receive a transformed data object that differs from the transformed data object received by the others.

Figure 5B:
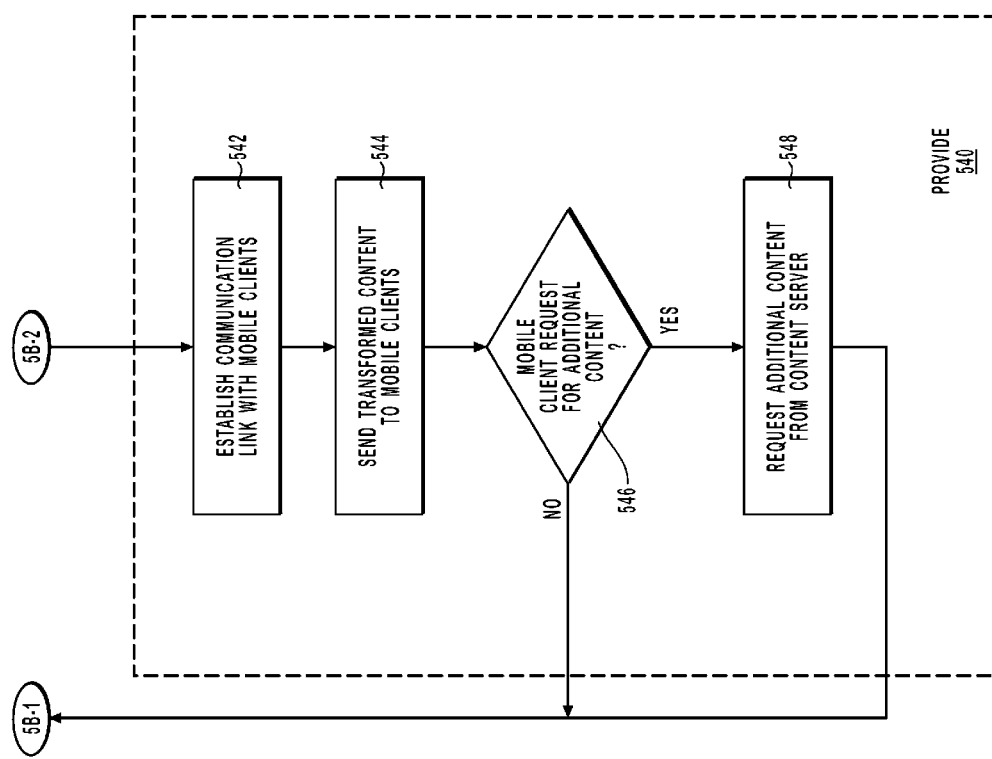

FIGS. 5A and 5B depict an exemplary method of a mobile gateway customizing content based on one or more operating characteristics of a mobile client. The step of associating (510) content transforms with a mobile client includes the act of assigning (512) content transforms to each mobile client. For example, a first transform may be assigned to a first mobile client and a second transform may be assigned to a second mobile client. Where a third mobile client is similar to the first mobile client, the first transform also may be assigned to the third mobile client.

The step for producing (520) transformed content based on the transforms associated with each mobile client may include the acts that follow. At 522, the mobile gateway receives content from a content server, such as an email server, a Web server, or some other type of content server. If decision block 524 determines the content is addressed to a list of recipients, the content is addressed to each specific mobile client (528). With content addressed to specific mobile clients, the content is altered (532) according to the transforms. The act of encrypting (536) the transformed content is shown separately to suggest that encryption, like other transform processing, may be shared among several otherwise distinct transforms. Although not shown, an act of compressing transformed content may precede the act of encrypting.

The step of providing (540) the transformed content to the mobile clients may include an act of establishing (542) a communication link with each of the mobile clients and an act of sending (544) the transformed content to each of the mobile clients. If an implementation only provides one-way notifications to mobile clients, no further processing is necessary. However, for implementations that include bi directional communication, processing may continue as follows. Decision block 546 shows the act of the mobile gateway receiving a request for additional content from a mobile client, such as may occur in response to a notification that a new email has been received. After receiving the request from the mobile client, the mobile gateway performs the act of requesting (548) the content from the content server. Whether or not mobile clients request additional content from the content server, processing returns prior to block 522, where the mobile gateway waits for content to be received from the content server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computerized system that includes a content server, a mobile gateway, and a first group of mobile clients that share at least one operating characteristic that is different from an operating characteristic shared by mobile clients in a second group of one or more mobile clients, a method of the mobile gateway, rather than the content server, customizing the content based on at least one operating characteristic of each group of mobile clients, wherein the customizing avoids further transformation processing at the content server, the method comprising the acts of:

the content server sending stored content directly to the mobile gateway without the content server performing any transformation on the content;

the mobile gateway assigning a first transform to the first group of mobile clients and assigning a second transform to the second group of one or more mobile clients, the first and second transforms specifically considering one or more shared operating characteristics of the first and second groups of mobile clients;

the mobile gateway receiving a list from the content server containing addresses for a plurality of mobile clients, including the first and second groups of mobile clients;

determining at the mobile gateway that the first transform and the second transform are to be applied to the received content upon the mobile gateway identifying that the list includes and address for one or more mobile clients in the first and second group;

altering the content at the mobile gateway according to the first and second transforms so that the content is compatible with the one or more operating characteristics of the first and second groups of mobile clients, the altered content comprising at least a first transformed content and a second transformed content;

further altering the content at the mobile gateway according to one or more sub-transforms that specifically consider one or more different operating characteristics between mobile clients within the same first group of mobile clients;

addressing the first transformed content to the first group of mobile clients and addressing the second transformed content to the second group of mobile clients using the plurality of addresses received in the list;

establishing a communication link between the mobile gateway and the mobile clients in the list received from the content server; and sending the content transformed in accordance with the first or second transforms, and one or more additional sub-transforms, to one or more mobile clients in the first or second groups of mobile clients.

2. A method as recited in claim 1, further comprising the act of at least one of the transforms encrypting the content.

3. A method as recited in claim 1, further comprising the act of at least one of the transforms compressing the content.

4. A method as recited in claim 1, wherein at least one of the mobile clients is one of a telephone, a pager, a personal digital assistant, or a cascaded mobile gateway.

5. A method as recited in claim 1, wherein the first transformed content comprises a notification that additional content is available at the content server, the method further comprising the acts of:

receiving a request for the additional content from a mobile client in the first group;

retrieving the additional content from the content server, wherein the additional content has not been altered in accordance with any one or more of the first or second transforms;

altering the additional content according to the first transform and one or more sub transforms so that the content is compatible with a plurality of operating characteristics of the first mobile client; and sending the first transformed additional content to the first mobile client.

6. A method as recited in claim 1, wherein the one or more operating characteristics considered by the first and second transforms include a mobile client's memory capabilities, and at least one of the mobile client's software, processor, display, or communication link.

7. A method as recited in claim 1, wherein the computerized system includes a third mobile client, the method further comprising the acts of:
assigning the first transform to the third mobile client, the first transform specifically considering one or more operating characteristics of the third mobile client; and
sending the first transformed content to the third mobile client.

8. A method as recited in claim 1, wherein the content comprises one of email, calendar, contact, task, Web, notification, financial, configuration, or sports content.

9. At a mobile gateway in a computerized system that includes a content server, the mobile gateway, and a first mobile client, wherein the mobile gateway receives from the content server, content that is addressed to the first mobile client, a method of customizing the content based on at least one operating characteristic of the first mobile client, wherein the customizing avoids further processing at the content server, the method comprising a mobile gateway performing the acts of:
assigning a first transform to a first mobile client and a second transform to a second mobile client, the first transform specifically considering one or more operating characteristics of the first mobile client, the second transform specifically considering one or more operating characteristics of the second mobile client;
determining at the mobile gateway that a change has occurred with the one or more operating characteristics of the first mobile client, such that prior hardware or software configuration information of the first mobile client is incompatible with the first transform;
creating an updated first transform at the mobile gateway, wherein the updated first transform is consistent with the change in operating characteristics of the first mobile client;
receiving content from the content server that has not yet been transformed;
altering the content at the mobile gateway according to the updated first transform and with the second transform so that the content is compatible with the change in the one or more operating characteristics of the first mobile client and with the one or more operating characteristics of the second mobile client;
further altering the content at the mobile gateway according to one or more sub transforms so that the content is further compatible with another characteristic of the first and second mobile clients;
establishing a communication link between the mobile gateway and the first mobile client; and
the mobile gateway sending the content altered in accordance with the updated first transform and one or more sub transforms to the first mobile client, and sending the content altered in accordance with the second transform and any one or more sub transforms to the second mobile client.

10. A method as recited in claim 9, wherein the one or more operating characteristics considered by the updated first transform include the first mobile client's memory capabilities, and at least one of the first mobile client's software, processor, display, or communication link.

11. A method as recited in claim 9, further comprising the act of the first transform encrypting the content.

12. A method as recited in claim 9, further comprising the act of the first transform compressing the content.

13. A method as recited in claim 9, wherein the first transformed content comprises a notification that additional content is available at the content server, the method further comprising the acts of:
receiving a request for the additional content from the first mobile client;
retrieving the additional content from the content server;
altering the additional content according to the updated first transform so that the content is compatible with the change in one or more operating characteristics of the first mobile client, the act of altering producing a first transformed additional content; and
sending the first transformed additional content to the first mobile client.

14. A method as recited in claim 9, wherein the first mobile client is one of a telephone, a pager, a personal digital assistant, or a cascaded mobile gateway.

15. A method as recited in claim 9, wherein the content comprises one of email, calendar, contact, task, Web, notification, financial, configuration, or sports content.

16. A method as recited in claim 9, further comprising the acts of:
updating the second transform to the second mobile client, the updated second transform specifically considering a change in one or more operating characteristics of the second mobile client;
altering the content according to the updated second transform at the mobile gateway so that the content received from the content server is compatible with the change in one or more operating characteristics of the second mobile client;
establishing a communication link between the mobile gateway and the second mobile client; and
sending the content altered according to the updated second transform to the second mobile client.

17. A method as recited in claim 16, wherein the content received from the content server is addressed to a list containing the first and second mobile clients, the method further comprising the act of addressing the content specifically to the first mobile client and to the second mobile client as defined in the list.

18. A method as recited in claim 16, wherein the computerized system includes a third mobile client, the method further comprising the acts of:
assigning the first transform to the third mobile client, the first transform specifically considering one or more operating characteristics of the third mobile client; and
sending the first transformed content to the third mobile client.

19. In a computerized system that includes a content server, a mobile gateway, and a first mobile client, wherein the mobile gateway receives from the content server, content that is addressed to the first mobile client, a computer program storage product computer-executable instructions stored thereon that, when executed, cause one or more processors in the computerized system to perform a method of customizing the content based on at least one operating characteristic of the first mobile client, wherein the customizing avoids further processing at the content server, comprising:
assigning a first configuration transform to the first mobile client, the first configuration transform customizing configuration information for one or more services available to the first mobile client;
assigning a first transform to a group of mobile clients including the first mobile client, the first transform specifically considering one or more shared operating characteristics of the first mobile client and each other mobile client in the group;
determining that a change has occurred in at least one service available to the first mobile client;
receiving content and a recipient list for the content from the content server, wherein the content has not yet been altered in accordance with the first or second transform;
identifying from the received recipient list for the content that the first transform and the second transform are to be applied;
altering the content according to the first transform and one or more sub transforms for the first mobile client, so that the content is compatible with the one or more operating characteristics of the first mobile client, the altered content comprising a first transformed content;
customizing configuration information relative to the change in the at least one service available to the first mobile client based on the first configuration transform to provide first transformed configuration information;
establishing a communication link between the mobile gateway and the first mobile client; and
sending the first transformed content and the first transformed configuration information to the first mobile client.

20. The computer program storage product as recited in claim 19, wherein the one or more operating characteristics considered by the first transform include the first mobile client's memory at least one of the first mobile client's software, processor, display, or communication link.

21. The computer program storage product as recited in claim 19, the method comprised further of machine-executable instructions for the first transform performing the act of encrypting the content.

22. The computer program storage product as recited in claim 19, the method comprised further of machine-executable instructions for the first transform performing the act of compressing the content.

23. The computer program storage product as recited in claim 19, wherein the first transformed content comprises a notification that additional content is available at the content server, the method further comprising the acts of:
receiving a request for the additional content from the first mobile client,
retrieving the additional content from the content server, wherein the additional content has not been altered in accordance with any one or more of the first or second transforms;
altering the additional content according to the first transform and any one or more sub transforms so that the content is compatible with the one or more operating characteristics of the first mobile client, the act of altering producing a first transformed additional content; and
sending the first transformed additional content to the first mobile client.

24. The computer program storage product as recited in claim 19, wherein the first mobile client is one of a telephone, a pager, and a personal digital assistant and wherein the content comprises one of email, calendar, contact, task, Web, notification, financial, configuration, or sports data.

25. The computer program storage product as recited in claim 19, wherein the computerized system includes a second mobile client, the method further comprising the acts of:
assigning a second transform to the second mobile client, the second transform specifically considering one or more operating characteristics of the second mobile client;
altering the content according to the second transform and one or more sub transforms so that the content is compatible with the one or more operating characteristics of the second mobile client, the altered content comprising a second transformed content;
establishing a communication link between the mobile gateway and the second mobile client; and
sending the second transformed content to the second mobile client.

26. The computer program storage product as recited in claim 25, wherein the content received from the content server is addressed to a list containing the first and second mobile clients, the method comprised further of machine-executable instructions for performing the act of addressing the content specifically to the first mobile client and to the second mobile client as defined in the list.

27. The computer program storage product as recited in claim 25, wherein the computerized system includes a third mobile client, the method further comprising the acts of:
assigning the first transform to the third mobile client, the first transform specifically considering one or more operating characteristics of the third mobile client; and
sending the first transformed content to the third mobile client.

28. At a mobile gateway in a computerized system in which the mobile gateway receives content intended to be pushed to mobile clients from a content server, a method of the mobile gateway customizing the content from the content server based one or more operating characteristics identified for a plurality of intended recipients using a plurality of different devices with differing operating characteristics, comprising the acts of:
receiving content from a content server at the mobile gateway, wherein the content has not yet been transformed by the content server, and the content is addressed by the content server to at least a first mobile client, a second mobile client, and a different mobile gateway;
a step for determining at the mobile gateway an appropriate content transform and one or more sub transforms for each of the first mobile client, the second mobile client, and for the different mobile gateway based on detected operating characteristics for each of the first mobile client, the second mobile client, and for the different mobile gateway;
assigning at the mobile gateway a first content transform to the first mobile client, a second content transform to the second mobile client, and a third content transform to the different mobile gateway;
wherein the first, second, and third content transforms, and one or more sub transforms, correspond to the detected one or more operating characteristics of the first mobile client, the second mobile client, and the devices managed by the different mobile gateway, such that the first, second, and third content transforms are not shared between the first, second, or third mobile clients;
wherein at least two of the first, second, and third mobile devices share the same sub transform used to alter the content after alteration by any of the first, second, or third content transforms;
the mobile gateway sending content transformed by an updated first content transform and at least one sub transform to the first mobile client, content transformed by the second content transform and at least one sub transform to the second mobile client, and content transformed by the third content transform and at least one sub transform to the different mobile gateway.

29. A method as recited in claim 28, wherein the step for determining an appropriate transform comprises the acts of:
- identifying one or more operating characteristics for each of the first mobile client and the second mobile client;
- identifying one or more operating characteristics for devices managed by the different mobile gateway; and
- updating the first transform upon identifying a change in memory capacity of the first mobile client.

30. A method as recited in claim 29, further comprising the acts of:
- receiving new content from the content server, wherein at least a portion of the new content is too large for the first mobile client based on the change in memory capacity of the first mobile client;
- transforming the new content in accordance with the second content transform and in accordance with the third content transform; and
- sending the transformed new content to the second mobile client, and the different mobile gateway, but not to the first mobile client.

31. A method as recited in claim 28, wherein at least one of the first or second mobile clients is one of a telephone, a pager, a personal digital assistant, or a cascaded mobile gateway.

32. A method as recited in claim 28, wherein the first transformed content comprises a notification that additional content is available at the content server, the method further comprising steps for:
- producing a first additional transformed content based on a content transform associated with the first mobile client; and
- providing the first additional transformed content to the first mobile client.

33. A method as recited in claim 28, wherein the one or more operating characteristics considered by the content transforms include the mobile client's memory capabilities, and at least one of the mobile clients' software, processor, display, or communication link.

34. A method as recited in claim 28, wherein the computerized system includes a third mobile client, the method further comprising a step for providing content transformed by an updated first content transform to the third mobile client, due to similarities in one or more operating characteristics of the first and third mobile clients.

35. A method as recited in claim 28, wherein the content comprises one of email, calendar, contact, task, Web, notification, financial, configuration, or sports data.

* * * * *